United States Patent
Goodman

(10) Patent No.: US 12,208,652 B1
(45) Date of Patent: Jan. 28, 2025

(54) HITCH BALL ATTACHMENT FOR A SKID STEER OR FORKLIFT FORK

(71) Applicant: Cody B. Goodman, Abilene, TX (US)

(72) Inventor: Cody B. Goodman, Abilene, TX (US)

( * ) Notice: Subject to any disclaimer, the term of this patent is extended or adjusted under 35 U.S.C. 154(b) by 0 days.

(21) Appl. No.: 18/886,533

(22) Filed: Sep. 16, 2024

Related U.S. Application Data

(60) Provisional application No. 63/648,789, filed on May 17, 2024.

(51) Int. Cl.
| | |
|---|---|
| *B60D 1/06* | (2006.01) |
| *B60D 1/07* | (2006.01) |
| *B60D 1/52* | (2006.01) |

(52) U.S. Cl.
CPC ............... *B60D 1/06* (2013.01); *B60D 1/07* (2013.01); *B60D 1/52* (2013.01)

(58) Field of Classification Search
CPC ............... B60D 1/06; B60D 1/07; B60D 1/52
See application file for complete search history.

(56) References Cited

U.S. PATENT DOCUMENTS

| | | | |
|---|---|---|---|
| 5,755,452 A | 5/1998 | Tambornino | |
| 5,906,387 A * | 5/1999 | Wallace | B60D 1/54 280/491.1 |
| 6,135,701 A * | 10/2000 | Galloway, Sr. | B66F 9/18 280/415.1 |
| 7,819,416 B2 | 10/2010 | Moss | |
| 8,104,783 B2 * | 1/2012 | Blankenship | B60D 1/06 280/515 |
| 8,177,252 B2 | 5/2012 | Tambornino | |
| D664,076 S * | 7/2012 | Tambornino | D12/161 |

(Continued)

FOREIGN PATENT DOCUMENTS

| | | |
|---|---|---|
| CN | 213060087 U | 4/2021 |
| CN | 218400095 U | 1/2023 |

(Continued)

OTHER PUBLICATIONS

Chevron; Zip's Receiver Hitch for Chevron 408 Light Duty Wrecker; https://zips.com/parts-detail/zip%27s-receiver-hitch-for-chevron-408-lig-zp-408rhz-hitch.

(Continued)

*Primary Examiner* — Kevin Hurley
*Assistant Examiner* — Marlon A Arce
(74) *Attorney, Agent, or Firm* — HULSEY P.C.

(57) ABSTRACT

A hitch assembly having a hitch ball attachment for a skid steer or a forklift fork is disclosed. The hitch assembly includes a fork having a hitch receiving area that receives a hitch ball attachment. The fork includes a first frame and a second frame. The first frame includes frame holes aligning with the hitch receiving area. The hitch ball attachment has hitch holes configured to align with the frame holes. Further, the hitch ball attachment has hitch balls of different sizes. Further, the hitch assembly includes a locking pin and a quick release pin. The locking pin inserts through the frame holes and the hitch holes for connecting the hitch ball attachment to the fork while positioning the hitch balls vertically and allow transition between different towing configurations. Furthermore, the hitch assembly includes a connecting member for connecting the hitch ball attachment to the fork.

20 Claims, 8 Drawing Sheets

(56) References Cited

U.S. PATENT DOCUMENTS

| | | | |
|---|---|---|---|
| D750,536 S * | 3/2016 | Lusty | D12/162 |
| 10,336,145 B1 | 7/2019 | Dunn | |
| 11,241,922 B2 | 2/2022 | Altman | |
| 11,325,434 B2 | 5/2022 | Pennington | |
| 11,554,622 B2 | 1/2023 | Garcia | |
| 11,833,869 B2 | 12/2023 | McCall et al. | |
| 12,103,832 B2 * | 10/2024 | Schlabach | B66F 9/07504 |
| 2012/0006605 A1 | 1/2012 | Warachka | |
| 2020/0324611 A1 * | 10/2020 | Yano | B60H 1/32284 |

FOREIGN PATENT DOCUMENTS

| | | |
|---|---|---|
| CN | 117023460 A | 11/2023 |
| CN | 117246082 B | 2/2024 |
| CN | 117486133 B | 3/2024 |
| JP | 7439743 B2 | 2/2024 |

OTHER PUBLICATIONS

Containgo; ContainGo® Forklift Attachment; https://www.containgo.com/forklift-trailer-hitch-attachment.

* cited by examiner

HITCH BALL ATTACHMENT FOR A SKID STEER OR FORKLIFT FORK

CROSS-REFERENCE TO RELATED APPLICATIONS

The present application claims the benefit of provisional Application No. 63/648,789, filed May 17, 2024, all which is incorporated herein in its entirety and referenced thereto.

BACKGROUND OF THE INVENTION

Field of the Invention

The present invention relates to a hitch assembly, and in particular, relates to a hitch ball attachment for use with skid steers and/or forklift forks utilized for loading, unloading, towing, and transporting various materials.

Description of the Prior Art

It is known that skid steer loaders and forklifts are widely used across various industries, including construction, manufacturing, and material handling operations. Typical skid steer loaders or forklifts have hitch balls used for towing. Several hitch assemblies presenting one or more hitch ball attachments have been disclosed in the past.

One such example is disclosed in a U.S. Pat. No. 11,325,434, entitled "Rotatable trailer hitch ball mount" ("the '434 Patent"). The '434 Patent discloses a ball mount apparatus, for hitching a trailer to a vehicle, which can include up to three or more hitch balls of different size connected to a ball block which can be locked, unlocked, and rotated manually, without the use of tools, for positioning a selected ball for use. The ball block can also be rotated by hand between a rearwardly extending towing position and a forwardly extending stowed position.

Another example is disclosed in a U.S. Pat. No. 10,336,145, entitled "Multiple ball size/clevis hitch" ("the '145 Patent"). The '145 Patent discloses a multiple hitch member assembly for connecting a trailer to a tow vehicle where a hitch member is rotatably with respect to a main hitch member that is connected to a hitch receiver on the tow vehicle, where the hitch member carries a plurality of hitch elements (e.g., ball hitches of varying sizes) and where with the main hitch member secured to the hitch receiver the hitch member is rotatable to position a desired hitch element to be connected to a trailer or the like such that the hitch member cannot be removed from the main hitch member.

Another example is disclosed in a U.S. Pat. No. 7,819,416, entitled "Stowaway, receiver hitch" ("the '416 Patent"). The '416 Patent discloses a trunnion, adapted to fit in a receiver, attached to a vehicle as a receiver-type hitch system, provides selective deployment and stowage of a hitch. An optional base secured to the trunnion may receive a pivot. A mount, secured by the pivot to the base, swings between a deployed and a stowed position. Alignments are one-dimensional, typically circumferentially positioning a locking pin aperture and a corresponding locking pin about a radius with respect to a pivot axis. A platform of the mount may contain an aperture for operating as a pin hitch aperture or for receiving a stud or bolt for securing a ball hitch or two hitches. In certain embodiments, multiple ball hitches may be attached at once to the platform. Selection of ball hitch sizes and positioning of the ball hitch altitude may also be accomplished by pivots built into the mount.

Although the above discussed disclosures are useful, they have few problems. For example, traditional hitch ball attachments offer one or more fixed hitch balls, which come in different sizes. As they are fixed, it takes considerable time and manual effort to change the hitch connection, resulting in decreased productivity and increased operational costs.

Therefore, there is a need in the art to provide a unique hitch ball attachment having two or more different size hitch balls that can connect to a fork and allows to transition between different towing configurations without the need for frequent equipment changes or downtime.

SUMMARY OF THE INVENTION

It is an object of the present invention to provide a hitch ball attachment having two or more different size hitch balls.

It is another object of the present invention to provide a uniquely designed hitch ball attachment enabling users to effortlessly transition between different towing configurations by simply repositioning the hitch ball attachment as needed.

In order to achieve one or more objects, the present invention provides a hitch assembly having a hitch ball attachment for a skid steer or a forklift fork. The hitch assembly includes a fork having a L-shaped frame. The L-shaped frame has a first frame, and a second frame positioning perpendicularly to the first frame. The first frame has a hitch receiving area. The first frame has frame holes at both sides that align with the hitch receiving area. The hitch receiving area receives a hitch ball attachment. Further, the hitch ball attachment has a first section having hitch holes. Further, the first section presents hitch balls of different sizes extending perpendicularly from the first section. The hitch holes are aligned with the frame holes. The hitch balls of different sizes are used for different towing configurations.

In one aspect, the hitch assembly includes a locking pin and a quick release pin. The locking pin inserts through the frame holes and the hitch holes for connecting the hitch ball attachment to the first frame while positioning the hitch balls vertically. The hitch balls are positioned vertically for transitioning between different towing configurations.

In another aspect, the hitch assembly includes a connecting member for connecting the hitch ball attachment to the fork. The connecting member inserts in the first elongated body and the hitch ball attachment, and presents a flush side surface at the first elongated body. This ensures no additional parts protrude from the side of the first elongated body.

These and other objects of the present invention will be apparent from review of the following specification and the accompanying drawings.

DETAILED DESCRIPTION OF THE PREFERRED EMBODIMENT

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed hitch ball attachment. However, it will be apparent to those skilled in the art that the presently disclosed invention may be practiced without these specific details. In some instances, well-known structures and devices are shown in functional or conceptual diagram form in order to avoid obscuring the concepts of the presently disclosed hitch ball attachment.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes a hitch ball attachment, it is to be further understood that numerous changes may arise in the details of the embodiments of the hitch ball attachment. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

Various features and embodiments of a hitch assembly are explained in conjunction with the description of FIGUREs (FIGS. 1-13.

Figure 1:
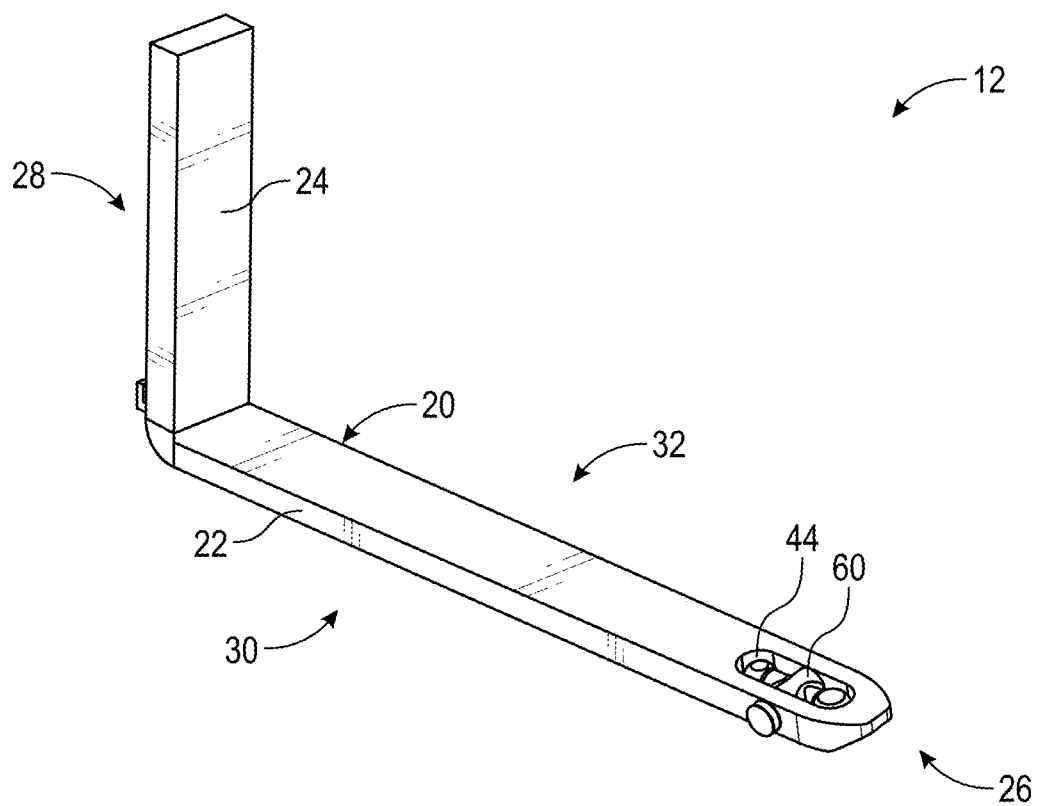
FIG. 1 is a perspective view of a hitch assembly in a resting position, in accordance with one embodiment of the present invention.
Figure 2:
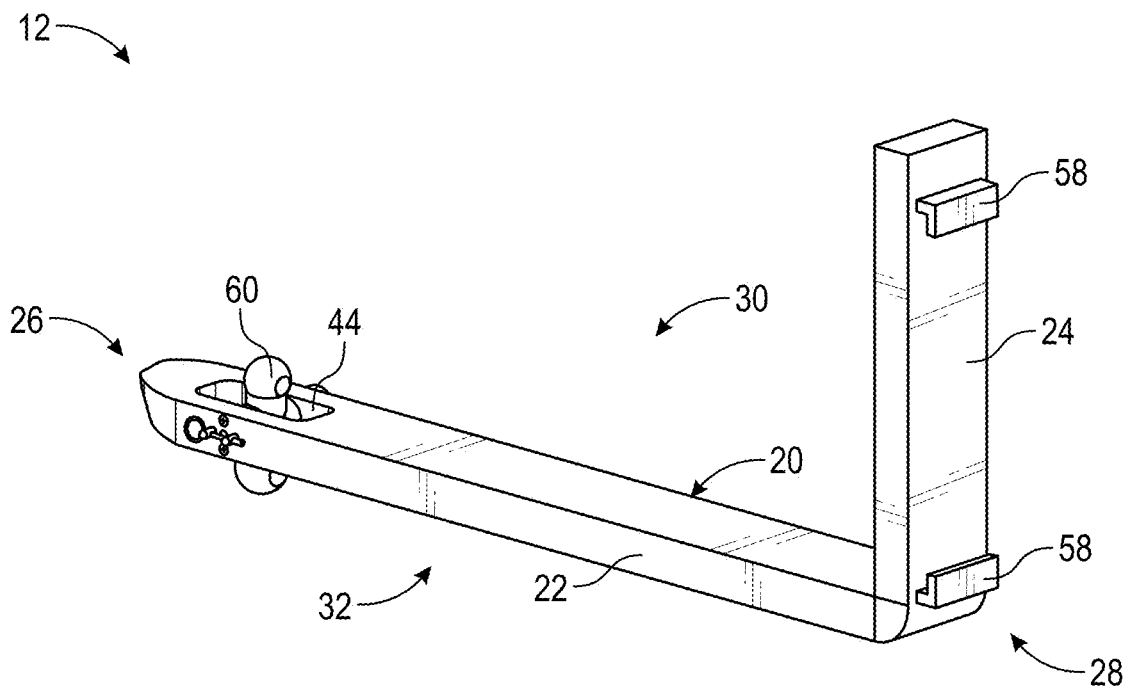
FIG. 2 is a perspective of the hitch assembly, in which a hitch ball attachment is in an operational configuration, in accordance with one embodiment of the present invention.

FIG. 1 shows a first side perspective view of a hitch assembly 10 in which a hitch ball attachment 60 is in a rest position i.e., positioned horizontally within a fork 20. Further, FIG. 2 shows a second side perspective view of hitch assembly 10 in which hitch ball attachment 60 is in an operational configuration i.e., positioned vertically within fork 20. Hitch assembly 10 presents fork 20. Fork 20 comes in a L-shaped configuration defining an area for carriage or transporting material or equipment. Fork 20 encompasses a first frame 22 and a second frame 24. As can be seen, first frame 22 and second frame 24 mount perpendicularly and form a L-shaped configuration. Fork 20 defines a first end 26, a second end 28, a third end 30, and a fourth end 32. First end 26 indicates a front end, and second end 28 indicates a rear end, respectively of fork 20. Further, third end 30 indicates a first side, say left side, and fourth end 32 indicates a second side, say right side, respectively of fork 20.

Figure 3:
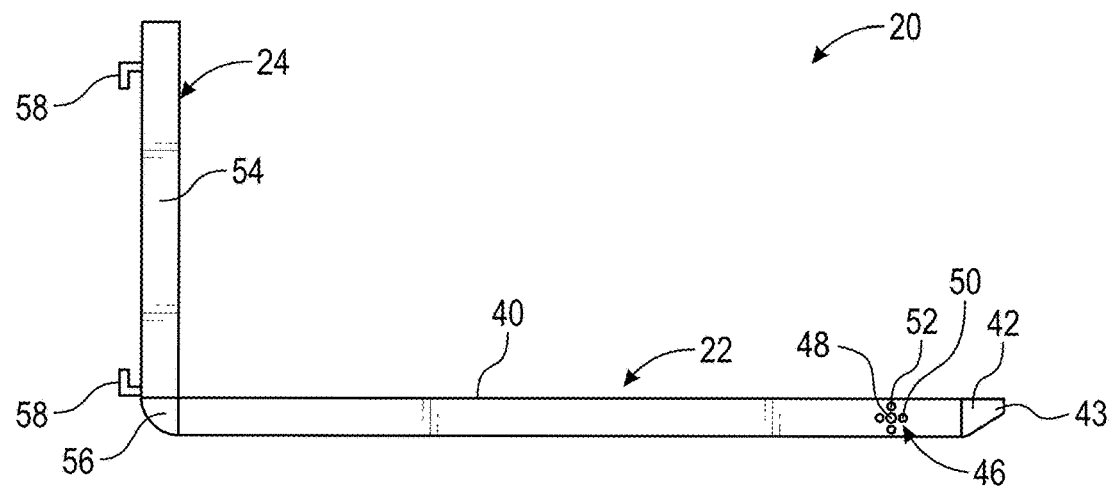
FIG. 3 is a side view of a fork, in accordance with one embodiment of the present invention.

FIG. 3 shows a side view of first frame 22 and second frame 24. First frame 22 presents a first elongated body 40. First elongated body 40 comes in a relatively flat rectangular configuration. First elongated body 40 is made of metal or any other suitable material. First frame 22 has a tapered section 42 extending from first elongated body 40. Tapered section 42 defines a tip 43 at distal end of first frame 22. Tip 43 is curved to prevent injuries or damage to the material being transported. In accordance with the present invention, first elongated body 40 encompasses a hitch receiving area 44. Hitch receiving area 44 indicates a cut-portion formed at first elongated body 40 for positioning hitch ball attachment 60.

In one embodiment, first elongated body 40 encompasses a group of holes 46. As can be seen from FIG. 3 and FIG. 8, holes 46 align with hitch receiving area 44 and position at both third end 30 and fourth end 32 of first frame 22. Holes 46 includes a (frame) central hole 48, first (frame) side holes 50, and second (frame) side holes 52. Central hole 48 positions at the center. First side holes 50 position adjacent to central hole 48. i.e., first end 26 and second end 28 of central hole 48. Second side holes 52 positions at top and bottom of central hole 48 i.e., two holes position vertically above and below central hole 48. In one example, central hole 48 has a larger diameter than first side holes 50, and second side holes 52. In one example, first side holes 50, and second side holes 52 have equal size. Optionally, first side holes 50 are larger than second side holes 52, or vice versa. In one example, central hole 48 has a diameter of 0.5". Further, each of first side holes 50 and second side holes 52 has a diameter of 0.38".

Still referring to FIG. 3, second frame 24 presents a second elongated body 54. Second elongated body 54 comes in a relatively flat rectangular configuration. Second elongated body 54 is made of metal or any other suitable material. As can be seen, second elongated body 54 connects perpendicularly to first elongated body 40. In one example, second elongated body 54 encompasses a curved section 56 at the intersection of second elongated body 54 and first elongated body 40. Curved section 56 helps to avoid sharp edges at the intersection of second elongated body 54 and first elongated body 40. Further, second elongated body 54 includes hook members 58 facing second end 28. Hook members 58 indicate skid steer attachments for connecting fork 20 to a skid steer (not shown). In one example, hook members 58 are made of metal and are welded to second elongated body 54.

Figure 4A:
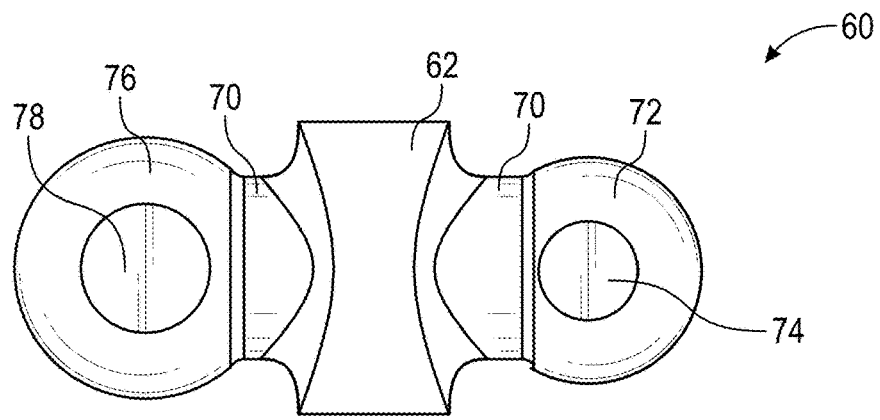
FIG. 4A, FIG. 4B and FIG. 4C illustrate a top view and a side view, respectively of the hitch ball attachment, in accordance with one embodiment of the present invention.
Figure 4B:
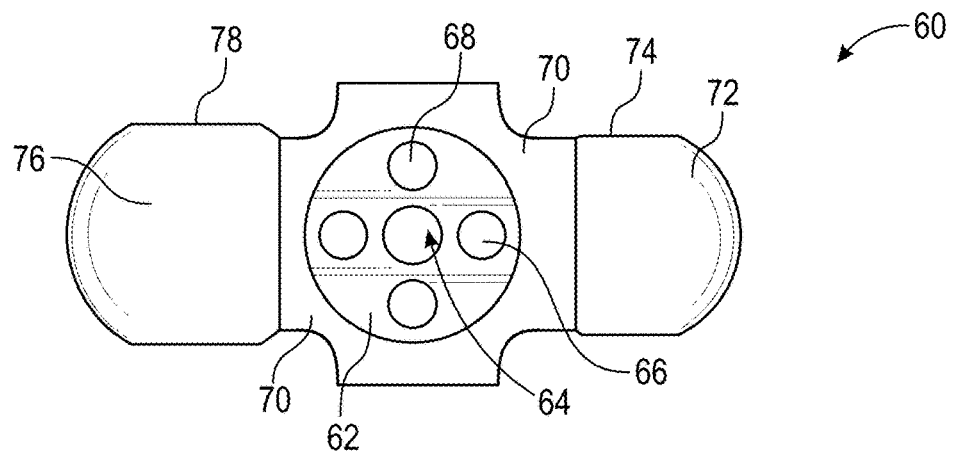
Figure 4C:
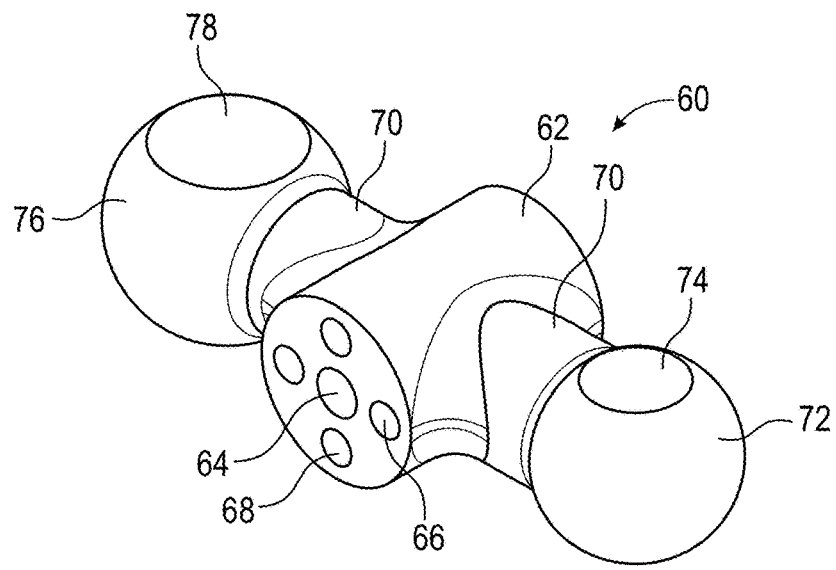

Referring back to FIG. 1 and FIG. 2, fork 20 encompasses a hitch ball attachment or rotating ball attachment 60. Hitch ball attachment 60 is made of metal or any other suitable material. FIG. 4A, FIG. 4B and FIG. 4C show a top view, a side view, and a perspective view, respectively of hitch ball attachment 60, in accordance with one embodiment of the present invention. Hitch ball attachment 60 encompasses a first section 62. First section 62 comes relatively in a cylindrical configuration. First section 62 presents a hitch central hole 64, hitch first side holes 66, and hitch second side holes 68, as shown in FIG. 4B. Hitch central hole 64 positions at the center. Hitch first side holes 66 position adjacent (horizontally) to hitch central hole 64. Hitch second side holes 68 position at top and bottom of hitch central hole 64 i.e., two holes position vertically above and below hitch central hole 64. In one example, hitch central hole 64 has a larger diameter than hitch first side holes 66, and hitch second side holes 68. In one example, hitch first side holes 66, and hitch second side holes 68 have equal size. Optionally, hitch first side holes 66 are larger than and hitch second side holes 68, or vice versa. In one example, hitch central hole 64 has a diameter of 0.5". Further, each of hitch first side holes 66 and hitch second side holes 68 has a diameter of 0.38". It should be understood that hitch central hole 64, hitch first side holes 66, and hitch second side holes 68 have the same size and align with central hole 48, first side holes 50, and second side holes 52, respectively.

Further, hitch ball attachment 60 has a second section 70 extending perpendicularly to first section 62, as can be seen at least in FIG. 4A and FIG. 4C. Second section 70 comes relatively in a cylindrical configuration. Second section 70 encompasses a first hitch ball 72 having a first flat section 74, at one end, a second hitch ball 76 having a second flat section 78, at another end. In one exemplary embodiment, first hitch ball 72 is smaller in size than second hitch ball 76. In one example, first hitch ball 72 presents as a 2" attachment. Further, second hitch ball 76 presents as a 2⅝" attachment. A person skilled in the art understands that first hitch ball 72 and second hitch ball 76 extend radially, with respect to second section 70. First flat section 74 provides a clearance with a hitch of a towed vehicle when first hitch ball 72 is used to connect to the hitch. Similarly, second flat section 78 provides a clearance with the hitch of the towed vehicle when second hitch ball 76 is used to connect to the hitch.

Figure 5A:
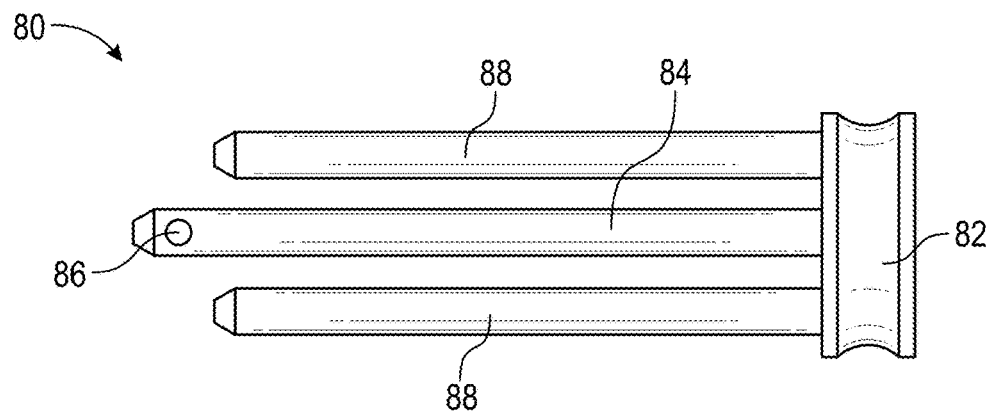
FIG. 5A and FIG. 5B illustrate a side view and a side perspective view, respectively of a locking pin, in accordance with one embodiment of the present invention.
Figure 5B:
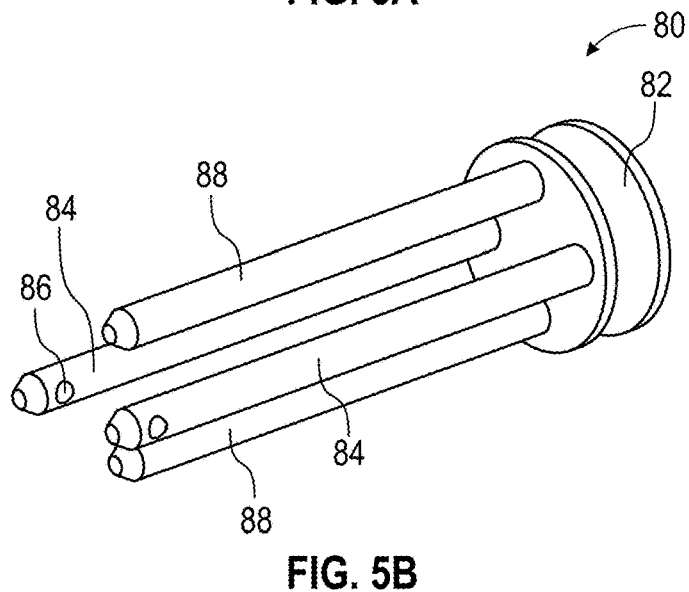

Further, hitch assembly 10 includes a locking pin 80. FIG. 5A and FIG. 5B show a side view and a side perspective view, respectively of locking pin 80, in accordance with one embodiment of the present invention. Locking pin 80 encompasses a head 82. Head 82 comes in a relatively circular configuration. Locking pin 80 includes first pins 84. Here, a pair of first pins 84 extends from head 82. Each first pin 84 includes a pin hole 86 closer to its distal end. Further, locking pin 80 includes second pins 88. Here, a pair of second pins 88 extends from head 82. It should be understood that first pins 84 are longer than second pins 88.

Figure 6:
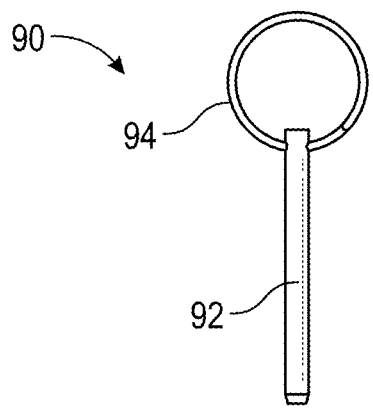
FIG. 6 is a front view of a quick release pin, in accordance with one embodiment of the present invention.
Figure 7:
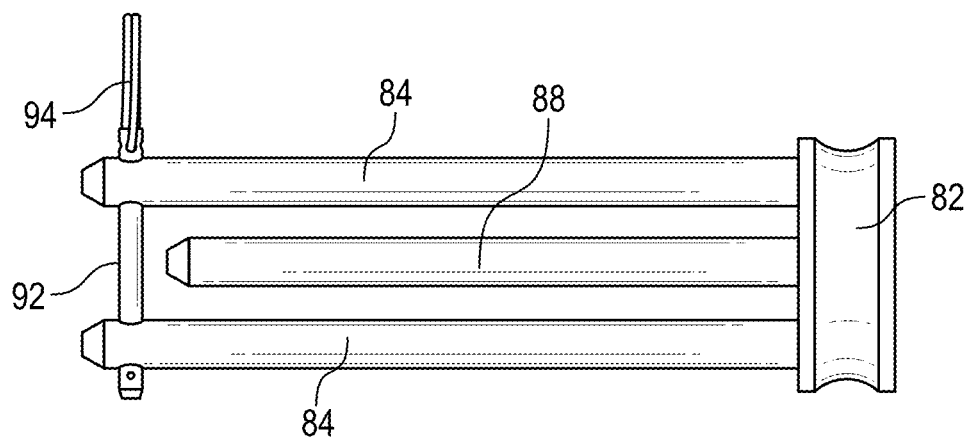
FIG. 7 is a top view showing the quick release pin inserted in the locking pin, in accordance with one embodiment of the present invention.

In one embodiment, hitch assembly 10 includes a quick release pin 90. FIG. 6 shows a front view of quick release pin 90, in accordance with one embodiment of the present invention. Quick release pin 90 includes an elongated bar 92 having a ring member 94. Quick release pin 90 operatively connects to first pins 84 via pin holes 86, as shown in FIG. 7, for example.

Figure 8:
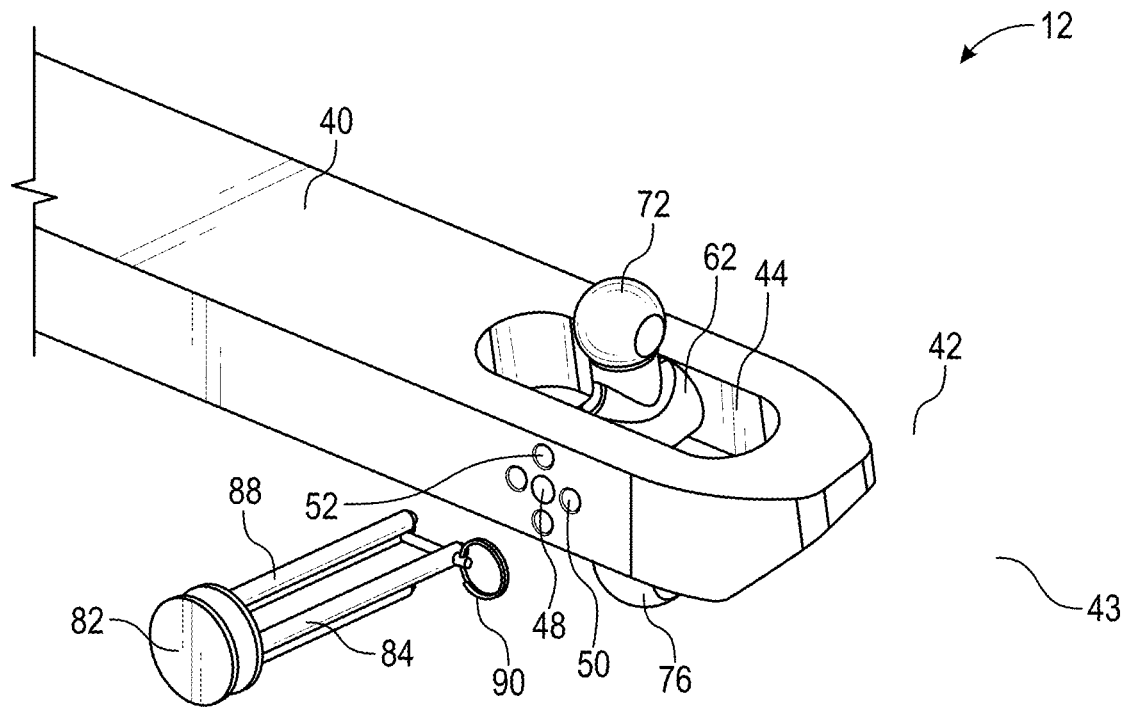
FIG. 8 illustrates the locking pin aligned with the fork and the hitch ball attachment, in accordance with one embodiment of the present invention.
Figure 9A:
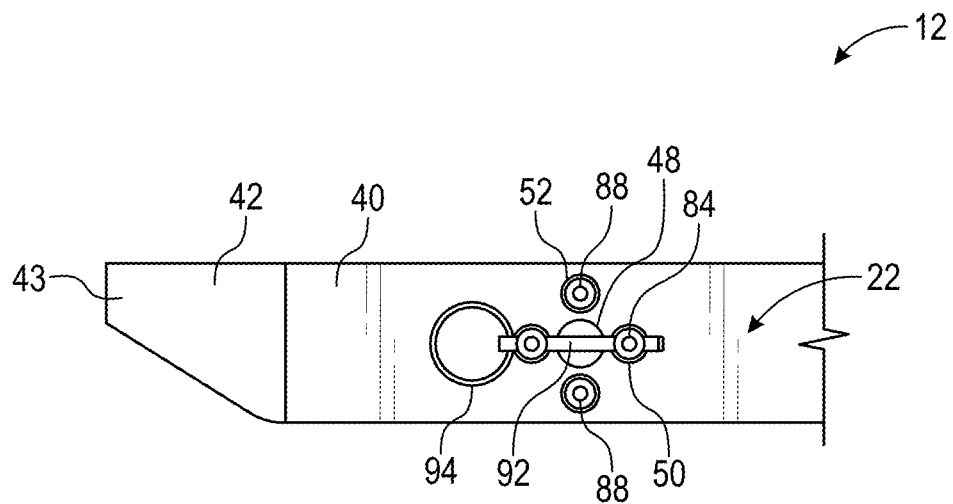
FIG. 9A and FIG. 9B illustrate a side view and a top view, respectively of the fork having the hitch ball attachment, in accordance with one embodiment of the present invention.
Figure 9B:
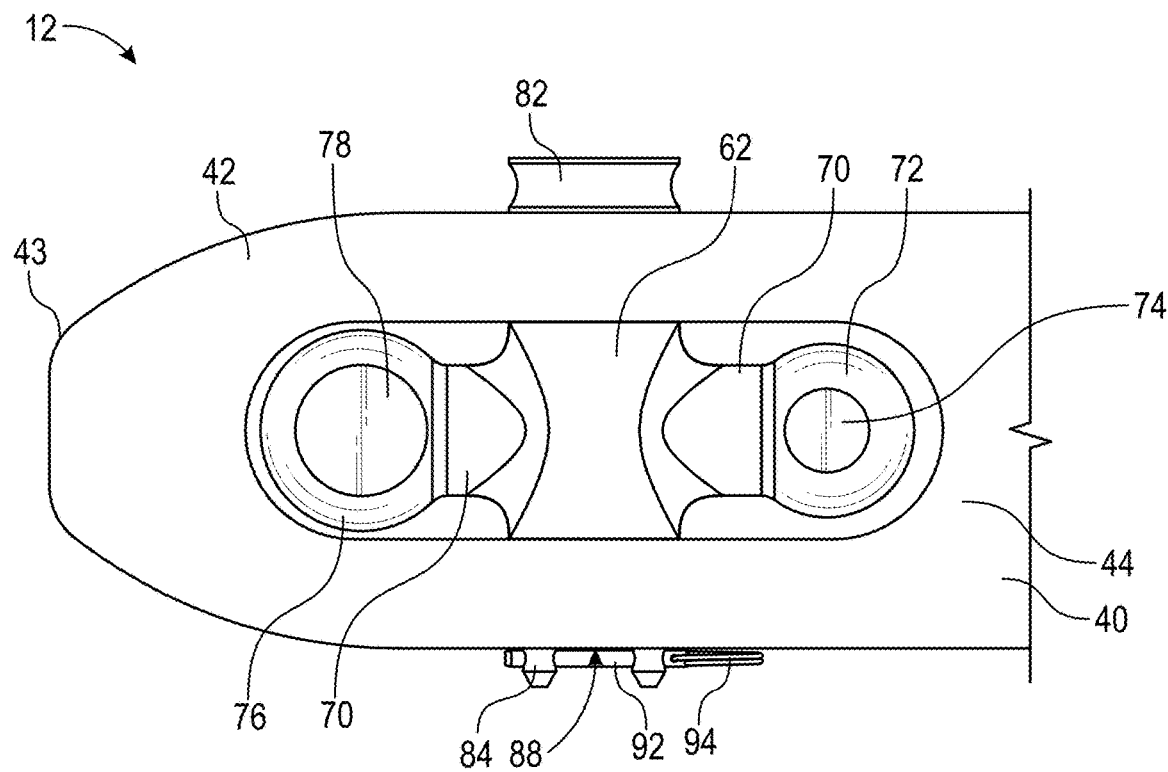

In accordance with one embodiment of the present invention, hitch ball attachment 60 is positioned within hitch receiving area 44 in a resting position, as shown in FIG. 1, for example. Further, hitch ball attachment 60 can be positioned such that first hitch ball 72 is made to position at the top and second hitch ball 76 is made to position at the bottom of first elongated body 40, as shown in FIG. 2, for example. Optionally, hitch ball attachment 60 can be positioned such that second hitch ball 76 is made to position at the top and first hitch ball 72 is made to position at the bottom of first elongated body 40. The choice of positioning first hitch ball 72 or second hitch ball 76 at the top or bottom depends on the size of the hitch that needs to be connected. Considering first hitch ball 72 needs to be positioned at the top, first section 62 is placed within hitch receiving area 44 such that hitch central hole 64, hitch first side holes 66, and hitch second side holes 68 align with central hole 48, first side holes 50, and second side holes 52. Subsequently, locking pin 80 is aligned to connect hitch ball attachment 60 to fork 20, as shown in FIG. 8. Here, hitch ball attachment 60 is positioned such that first pins 84 align with first side holes 50 and hitch first side holes 66, second pins 88 align with second side holes 52 and hitch second side holes 68. Subsequently, first pins 84 are inserted into first side holes 50 and first side holes 66, and second pins 88 are inserted into second side holes 52 and hitch second side holes 68. As presented above, first pins 84 are longer than second pins 88. As such, first pins 84 protrude out farther than second pins 88 from the other end of first elongated body 40. At this point, elongated bar 92 of quick release pin 90 is inserted through pin holes 86 of first pins 84. FIG. 9A and FIG. 9B show a side view and a top view, respectively of first frame 22 illustrating hitch ball attachment 60 connected to first frame 22 via locking pin 80. As can be seen, head 82 rests at one side of first elongated body 40 and quick release pin 90 locks first pins 84 in place to retain hitch ball attachment 60 inside hitch receiving area 44. In order to change the position of hitch ball attachment 60 upside down, a user pulls quick release pin 90 via ring member 94, and removes locking pin 80. Subsequently, the user positions hitch ball attachment 60 in which second hitch ball 76 is at the top, and first hitch ball 72 is at the bottom of first elongated body 40. Further, pins 84, 88 insert into holes 50, 52, and 66, 68, and elongated bar 92 is inserted through pin holes 86 of first pins 84, as explained above.

Figure 10:
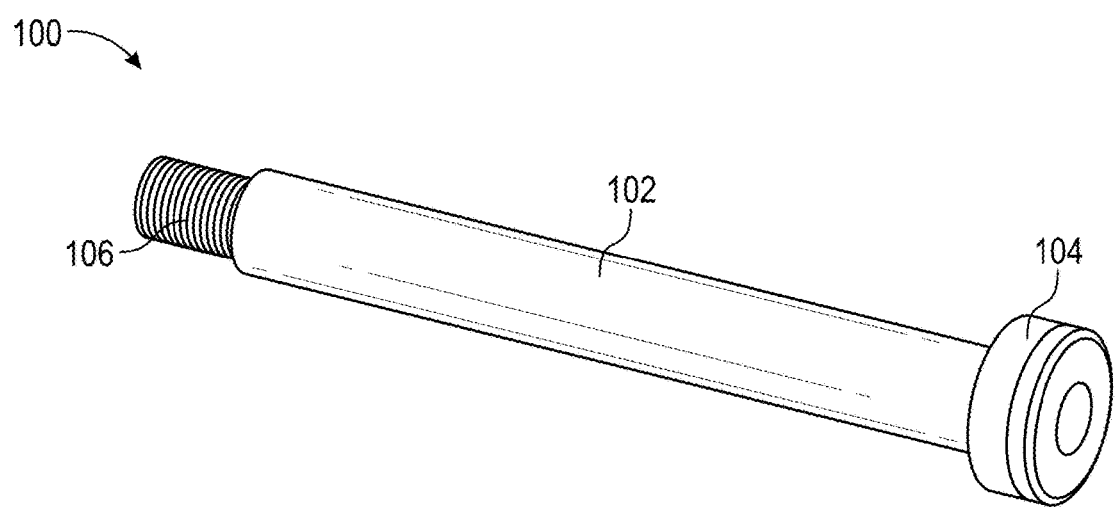
FIG. 10 is a perspective view of a connecting member, in accordance with one embodiment of the present invention.
Figure 11:
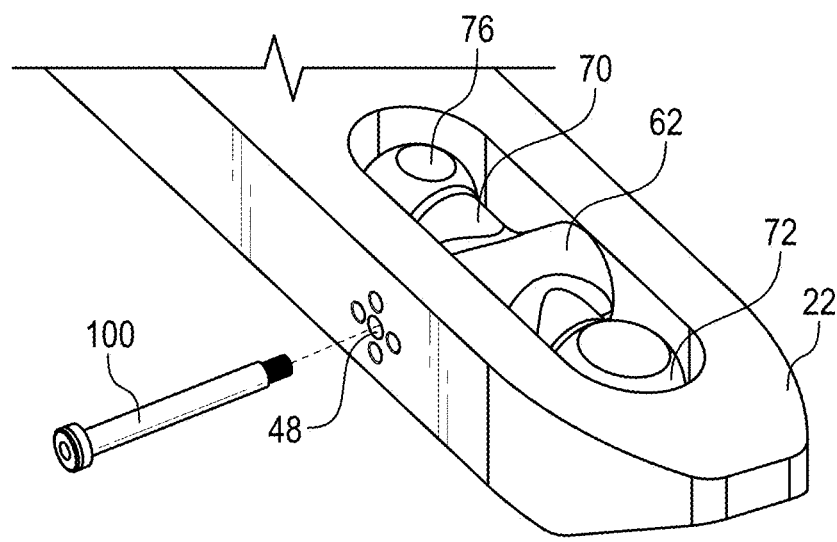
FIG. 11 illustrates the connecting member aligned with the fork and the hitch ball attachment, in accordance with one embodiment of the present invention.
Figure 12:
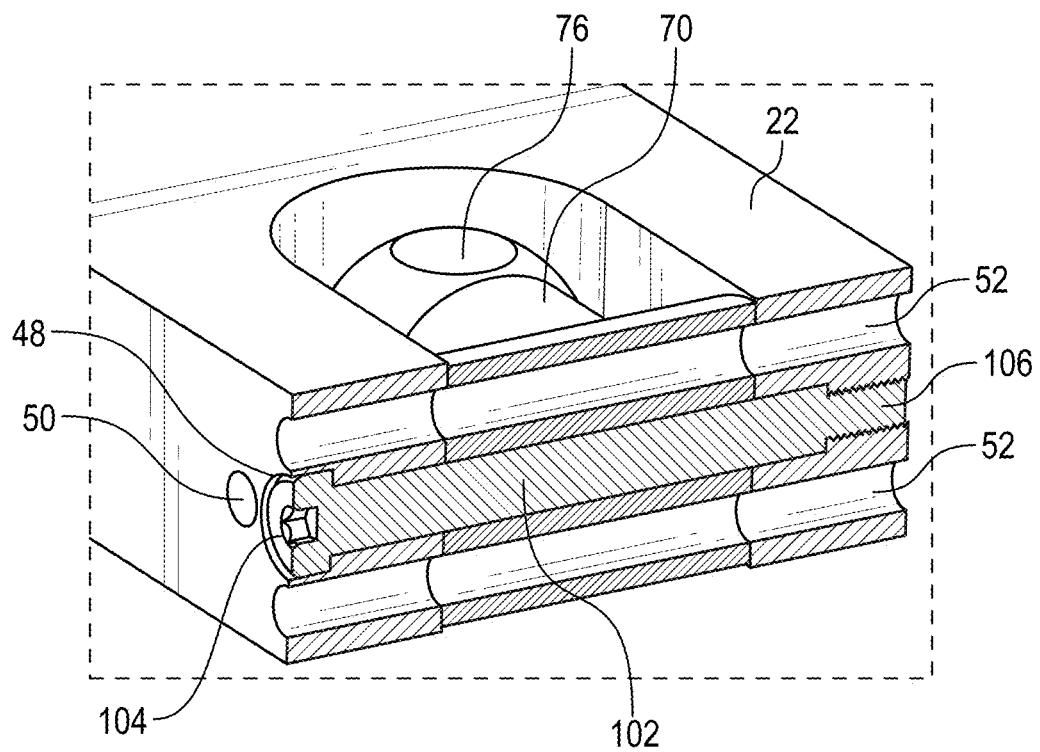
FIG. 12 is a side cross-sectional view of the fork having the connecting member, in accordance with another embodiment of the present invention.

In one embodiment, hitch assembly 10 includes a connecting member 100. FIG. 10 shows a perspective view of connecting member 100, in accordance with one embodiment of the present invention. Connecting member 100 encompasses elongated member 102. Elongated member 102 includes a head 104 at one end, and a threaded portion 106 at the other end. In accordance with one embodiment, connecting member 100 is configured to insert through central hole 48 and hitch central hole 64 for connecting hitch ball attachment 60 to first elongated body 40. FIG. 11 shows connecting member 100 aligned with first elongated body 40 and hitch ball attachment 60. Further, FIG. 12 shows a side cross-sectional view in which connecting member 100 is inserted in first elongated body 40 and hitch ball attachment 60. In one example, central hole 48 is machined to receive head 104 and threaded portion 106, as shown in FIG. 12, for example. When needed, the user removes connecting member 100 from first elongated body 40 and hitch ball attachment 60, and changes the position of hitch ball attachment 60, say positions vertically and inserts connecting member 100 to position first hitch ball 72 and second hitch ball 76 vertically, as explained above. The present embodiment is presented to illustrate an alternate embodiment for connecting the hitch ball attachment 60 to first elongated body 40. Optionally, connecting member 100 is inserted to connect hitch ball attachment 60 to first elongated body 40, when hitch ball attachment 60 is not needed for hitch connecting. Here, connecting member 100 helps to position hitch ball attachment 60 horizontally within hitch receiving area 44, when not in use. Connecting member 100 inserts in first elongated body 40 and hitch ball attachment 60, and presents a flush side surface at first elongated body 40. This ensures no additional parts protrude from the side of first elongated body 40.

Although the above description is explained considering two different hitch ball sizes, the hitch ball attachment can be provided with three or more hitch balls having different sizes extending from first section 62, without departing from the scope of the present invention.

Figure 13:
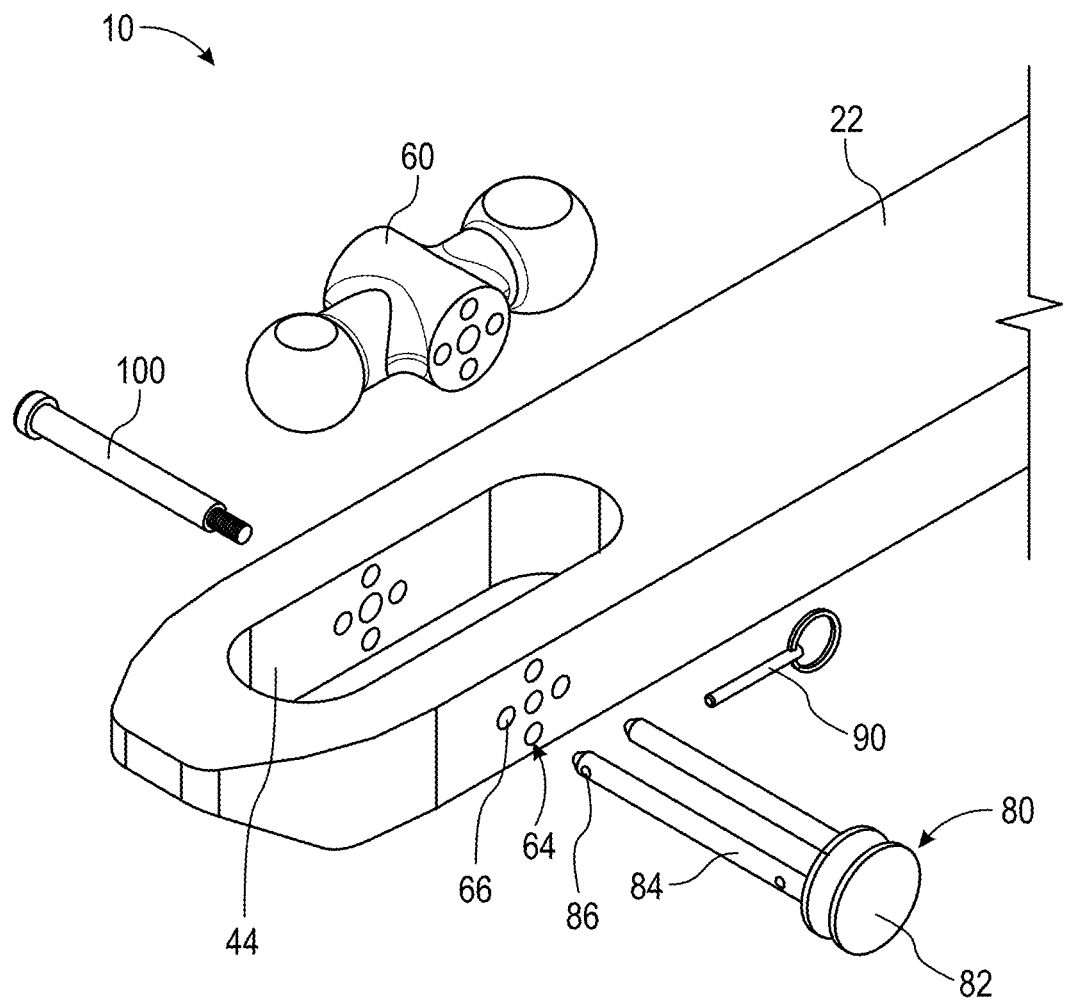
FIG. 13 is an exploded view of the hitch assembly, in accordance with another embodiment of the present invention.

In one implementation, locking pin 80 comes with only a pair of first pins 84 without the need for second pins 88. FIG. 13 shows an exploded view of hitch assembly 10 in which locking pin 80 includes only first pins 84. In order to connect hitch ball attachment 60 to first frame 22 via locking pin 80, first pins 84 insert into first side holes 50 and first side holes 66. As presented above, first pins 84 protrude out from the other end of first elongated body 40. At this point, elongated bar 92 of quick release pin 90 inserts through pin holes 86 of first pins 84, as explained above.

The presently disclosed hitch ball attachment used with a hitch assembly provides several advantages over the prior art. The hitch ball attachment integrates multiple hitch ball sizes into a single attachment compatible with skid steer and/or forklift forks. As the hitch ball attachment incorporates two or more hitch ball sizes within the fork, the user can effortlessly transition between different towing configurations without the need for frequent equipment changes or downtime. The hitch ball attachment utilizes the locking pin, the quick release pin, and the connecting member, which are very easy to operate. As a result, the time taken to transition between different towing configurations is greatly reduced.

A person skilled in the art appreciates that the hitch ball attachment can come in a variety of shapes and sizes depending on the need and comfort of the user. Further, many changes in the design and placement of components may take place without deviating from the scope of the presently disclosed hitch ball attachment.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hitch assembly, comprising:
a fork comprising a first frame and a second frame, wherein said first frame positions horizontally and said second frame extends perpendicularly from said first frame;
a hitch receiving area positioned at said first frame;
frame holes positioned at said first frame, wherein said frame holes align with said hitch receiving area;
a hitch ball attachment configured to selectively position within said hitch receiving area of said first frame, wherein said hitch ball attachment comprises hitch holes, and hitch balls; and
a locking pin,
wherein said hitch ball attachment positions in said hitch receiving area such that said hitch holes align with said frame holes, and wherein said locking pin inserts through said frame holes and said hitch holes to position said hitch ball attachment in a resting position or in an operational configuration within said hitch receiving area.

2. The hitch assembly of claim 1, wherein said hitch ball attachment comprises a first section having said hitch holes, and a second section extending perpendicularly from said first section, and wherein said second section comprises said hitch balls of different sizes.

3. The hitch assembly of claim 1, wherein said hitch balls are of different sizes.

4. The hitch assembly of claim 1, further comprises a connecting member, wherein said connecting member inserts through said frame holes and said hitch holes to position said hitch ball attachment in said resting position or in said operational configuration within said hitch receiving area.

5. The hitch assembly of claim 1, wherein said locking pin comprises a head and a plurality of pins extending from the head, and wherein said plurality of pins inserts through said frame holes and said hitch holes.

6. The hitch assembly of claim 5, wherein said plurality of pins comprises pin holes, and wherein said hitch assembly further comprises a quick release pin configured to insert in said pin holes to secure said locking pin.

7. The hitch assembly of claim 1, wherein said second frame comprises hook members for connecting said fork to a skid steer.

8. A hitch assembly, comprising:
a fork comprising a first frame and a second frame, wherein said first frame positions horizontally and said second frame extends perpendicularly from said first frame;
a hitch receiving area positioned at said first frame;

frame holes aligned with said hitch receiving area;
a hitch ball attachment positioned within said hitch receiving area of said first frame, wherein said hitch ball attachment comprises a first section having hitch holes, wherein said hitch ball attachment comprises hitch balls extending from ends of said first section;
a connecting member; and
a locking pin,
wherein said hitch ball attachment positions in said hitch receiving area such that said hitch holes align with said frame holes,
wherein said connecting member and said locking pin are secured through said frame holes and said hitch holes to position said hitch ball attachment horizontally in a resting position within said hitch receiving area, and
wherein said connecting member and said locking pin are secured through said frame holes and said hitch holes to position said hitch ball attachment vertically in an operational configuration within said hitch receiving area exposing said hitch balls.

9. The hitch assembly of claim 8, wherein said frame holes comprise a center frame hole, and frame side holes positioned around said center frame hole.

10. The hitch assembly of claim 9, wherein said hitch holes comprise a center hitch hole, and hitch side holes positioned around said center hitch hole.

11. The hitch assembly of claim 10, wherein said connecting member inserts through said center frame hole and said center hitch hole.

12. The hitch assembly of claim 10, wherein said locking pin comprises a head and a plurality of pins extending from said head, and wherein said plurality of pins inserts through said frame side holes and said hitch side holes.

13. The hitch assembly of claim 12, wherein said plurality of pins comprises pin holes, and wherein said hitch assembly further comprises a quick release pin configured to insert in said pin holes to secure said locking pin.

14. The hitch assembly of claim 8, wherein said second frame comprises hook members for connecting said fork to a skid steer.

15. A method of providing a hitch assembly, said method comprising the steps of:
providing a fork comprising a first frame and a second frame, said first frame positioning horizontally and said second frame extending perpendicularly from said first frame;
providing a hitch receiving area at said first frame;
providing frame holes aligned with said hitch receiving area;
providing a hitch ball attachment configured to selectively position within the first frame;
providing hitch holes and hitch balls at hitch ball attachment;
providing a locking pin;
positioning said hitch ball attachment in said hitch receiving area such that said hitch holes align with said frame holes; and
inserting said locking pin through said frame holes and said hitch holes to position said hitch ball attachment in a resting position or in an operational configuration within said hitch receiving area.

16. The method of claim 15, further comprising:
providing a first section, and second sections extending at opposite ends from said first section, at said hitch ball attachment;
providing said hitch holes at said first section; and
providing said hitch balls at said second sections.

17. The method of claim 15, further comprising providing said hitch balls in different sizes.

18. The method of claim 15, further comprising:
providing a connecting member; and
inserting said connecting member through said frame holes and said hitch holes for positioning said hitch ball attachment in said resting position or in said operational configuration within said hitch receiving area.

19. The method of claim 15, further comprising:
providing a head, and a plurality of pins extending from said head at said locking pin; and
inserting said plurality of pins through said frame holes and said hitch holes.

20. The method of claim 19, further comprising:
providing pin holes at said plurality of pins; and
providing a quick release pin for insertion in said pin holes to secure said locking pin.

* * * * *